United States Patent Office 3,087,886
Patented Apr. 30, 1963

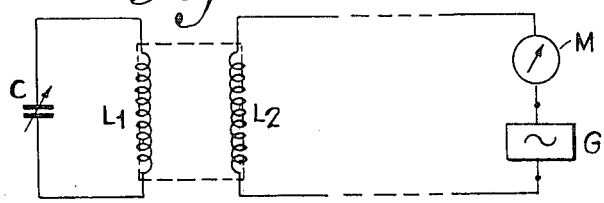
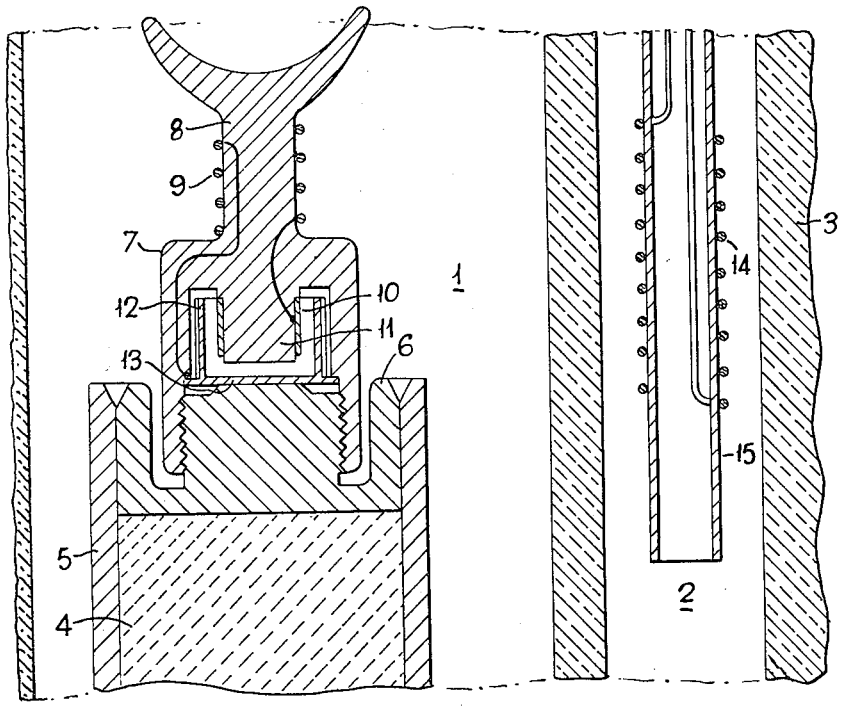
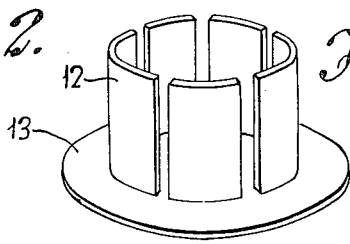

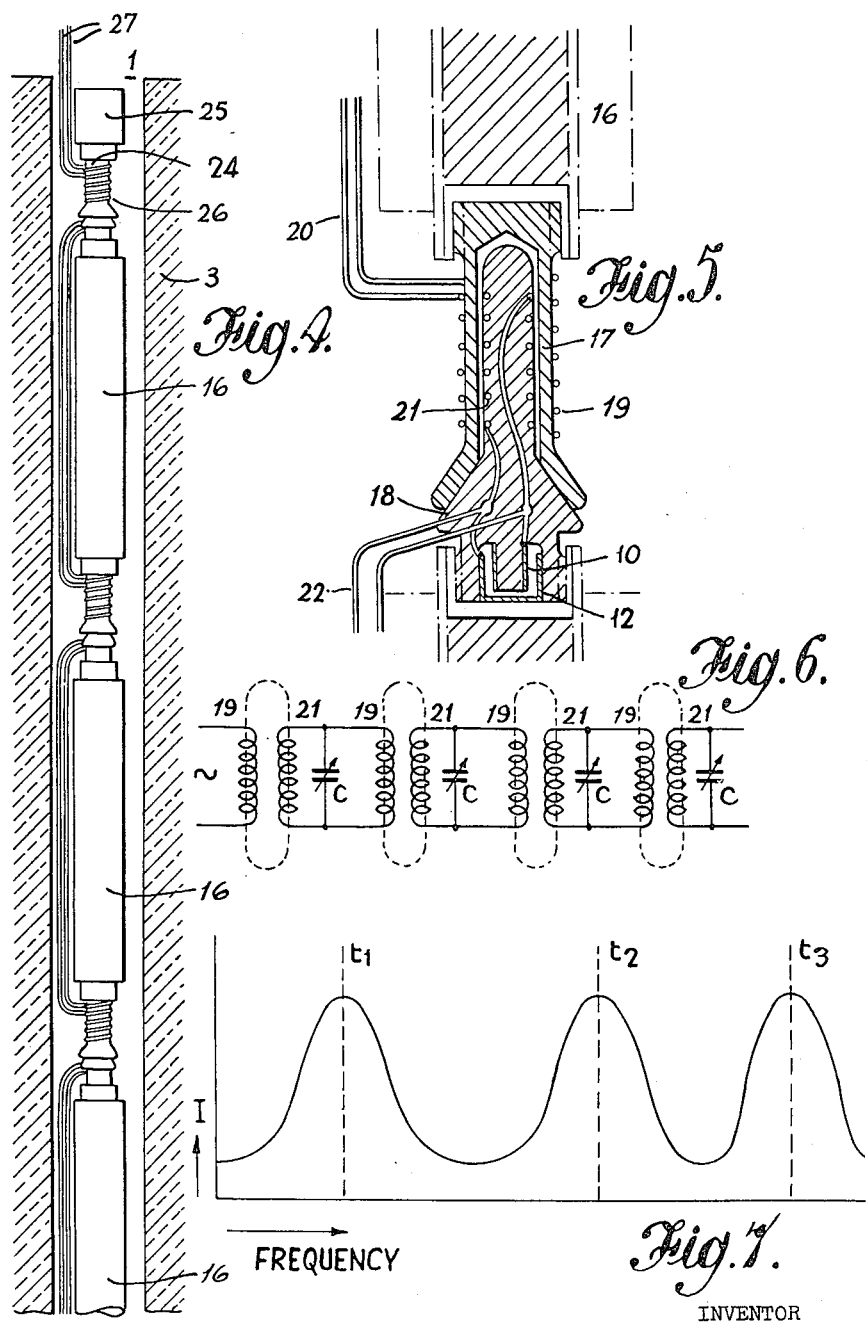

3,087,886
TEMPERATURE MEASUREMENT APPARATUS FOR A NUCLEAR REACTOR FUEL ELEMENT
John Albert Robinson, Wincham, Northwich, England, assignor to A.E.I.-John Thompson Nuclear Energy Company Limited, London, England, a British company
Filed Feb. 17, 1960, Ser. No. 9,313
Claims priority, application Great Britain Feb. 20, 1959
4 Claims. (Cl. 204—193.2)

This invention relates to apparatus for the remote measurement of variable quantities.

The invention has an important application in the measurement of temperature in inaccessible positions.

In nuclear reactors it is frequently necessary to measure the temperature of the fuel rods. This measurement presents difficulties since the rods are inaccessible and there is difficulty in feeding electrical leads downs the fuel channels in such a manner as to allow for removal of the fuel rods.

The main object of the invention is to provide remote measuring equipment which avoids these difficulties.

According to the present invention remote measuring apparatus comprises a resonant electrical circuit, the resonant frequency of which is controlled in accordance with the quantity to be measured together with an interrogating electrical circuit inductively coupled with the resonant circuit, which interrogating circuit has means for determining the resonant frequency of the resonant circuit and hence the quantity to be measured.

Such arrangements have the advantage that direct connection to the actual place at which the temperature or other measurement is made is not necessary and this has a particular advantage in the case of temperature measurement of fuel rods which, as above mentioned, are removable from the fuel channels.

According to one embodiment of the invention as applied to remote measurement of temperature the resonant circuit is an inductive capacitive circuit and means are provided for varying the capacitance in accordance with temperature together with means for passing an A.C. through the interrogating circuit and for varying the frequency of the A.C.

When the frequency of the A.C. in the interrogating circuit corresponds to the resonant frequency of the resonant circuit this fact will be indicated by a decrease of impedance of the interrogating circuit.

In the case of the temperature measurement of a nuclear fuel rod the interrogating circuit may include an inductance located in the channel extending through the reactor core adjacent to a fuel channel which inductance is so positioned as to be inductively coupled with an inductance mounted on the fuel rod or fuel rod carrier when this is correctly positioned in the fuel channel.

The capacitance may be varied by mounting one of the plates of a capacitor on a carrier which de-forms with increase in temperature so as to reduce the spacing of the plates. Such a carrier may, for example, be a bi-metal strip.

In the case of a number of fuel elements stacked in a fuel channel it may be desirable to measure the temperature of a number of the elements.

According to a further feature of the invention a plurality of adjacent fuel elements in a stack each include a tuned resonant circuit, the resonant frequency of which is controlled by the fuel element temperature, inductive couplings between resonant circuits of adjacent fuel elements so arranged that all the resonant circuits are electrically in cascade to form a composite circuit, together with an interrogating circuit inductively coupled with the composite circuit which interrogating circuit has means for determining resonance frequencies of the composite circuit and hence the temperatures to be measured.

Preferably means are provided for passing A.C. through the interrogating circuit and for sweeping the frequency of the A.C. over a band which includes the range of frequencies liable to be reached by the resonant circuits. In such a case the resonancies would be indicated by maximum values of current caused by the decreased impedance at resonance and the indicating apparatus may be suitably calibrated to read temperatures directly. It will be appreciated that such an arrangement has the advantage that only one interrogating circuit is required to measure the temperatures of several different fuel elements and it can, if necessary, be extended to read the temperatures of all the fuel elements in a stack whilst at the same time electrical contacts between adjacent elements are not required. Furthermore, only one type of thermo couple fuel element is necessary. (If the temperature of more than one element in a stack is required when using the conventional trailing lead method, this usually means several different types of elements charged in a special order.)

In order that the invention may be more clearly understood reference will now be made to the accompanying drawings, in which:

FIG. 1 is a circuit arrangement explaining the idea underlying the invention.

FIG. 2 shows somewhat diagrammatically how the invention can be applied to measurement of the temperature of a fuel element.

FIG. 3 is a detailed view of the movable plate of the capacitor.

FIG. 4 shows diagrammatically part of a stack of fuel elements embodying a modified form of the invention.

FIG. 5 is a detail view to an enlarged scale of a coupling between a pair of fuel elements in FIG. 4.

FIG. 6 shows an equivalent circuit diagram of the arrangement of FIG. 4, and

FIG. 7 illustrates graphically the current response in the interrogating circuit.

In FIG. 1 the resonant circuit is shown on the left and the interrogating circuit on the right. The resonant circuit comprises a variable capacitor C and an inductance L1; the interrogating circuit comprises an inductance L2, an indicating device, shown as a meter M, and an A.C. generator G. As above explained, in operation, the frequency of the A.C. generator G will be adjusted until it corresponds to the resonant frequency of the resonant circuit. When this condition is reached the resonant circuit will present a decreased impedance to the interrogating circuit and this will be indicated by a rise in current through the interrogating circuit. Clearly the generator G may be provided with a frequency control which is calibrated so as to give direct temperature reading. The frequency adjustment may, of course, be carried out manually or by any suitable automatic control.

It will be appreciated that in the case of a reactor the inductance L2 will be located in a passage in the core and will be connected by leads with the generator, indicator and other apparatus, all of which would be located external to the core in a remote position.

In FIG. 2, which shows the invention applied to a fuel rod, the reference 1 indicates a fuel channel housing the fuel rod and 2 is a separate channel in the reactor core 3 housing the interrogating circuit. The reference 4 indicates the fuel rod encased in the canning 5 and having an end cap 6 on to which is screwed a ceramic adapter 7. Around the neck 8 of the ceramic adapter is wound an inductance coil 9 which corresponds to L1 of FIG. 1 whilst the capacitor C is formed by an internal metallic sleeve 10 around a boss 11 and the annular wall 12 of a cup-shaped member having an end plate 13. The annular wall 12 is of a bi-metal nature and has a series of axial slits separating the wall into strips so arranged that with increase of temperature the strips between the slits are deflected inwardly towards the inner sleeve 10 so as to increase the capacitance between the plates 10 and 12. As will be seen the inner sleeve 10 is electrically connected with one end of the winding 9 and the wall 12 is connected with the other end of the same winding.

The interrogating winding 14 (L2 of FIG. 1) is wound on a former 15 supported in the passage 2 in the core and this winding 14 corresponds to the inductance L2 shown in FIG. 1. It is so positioned that there is sufficient inductive coupling between the windings 9 and 14 when the fuel channel is properly positioned to ensure that the condition of resonance may be determined.

Whilst in the embodiment shown the capacitor has been shown as deflecting under the action of a bi-metal strip, clearly the invention is not so limited and other arrangements may be employed for varying the capacitance.

Furthermore, whilst the invention is particularly suitable for remote temperature measurement it is not so limited but may be employed for remote measurement of other quantities, e.g. pressure, provided that the tuning of the resonant circuit may be arranged to follow variations in said quantities.

In FIG. 4 the reference 3 indicates the reactor core having a fuel channel 1 extending vertically down its height and housing fuel elements 16. The lower end of each of the fuel elements 16 is provided with a plug extension formed into a socket 17 and shown in greater detail in FIG. 5. Similarly, at the upper ends of the fuel elements, there is a plug extension formed into an extension pin 18 which fits into the socket at the upper end of the underneath fuel element. Around the socket wall is an inductance winding 19 which is connected through leads 20 with the upper end of the upper fuel element shown in FIG. 5, and similarly around the pin 18 is an inductance winding 21 connected on the one hand through leads 22 with the socket at the lower end of the lower fuel element shown in FIG. 5, and on the other hand with the capacitance which is formed by the inner cylindrical plate 10 and the outer cylindrical plate 12, the outer cylindrical plate being bi-metallic and expanding inwardly as the temperature increases so as to increase the capacitance of the circuit as described in connection with FIGS. 2 and 3.

It will be appreciated that the fuel elements are identical and the upper fuel element will have a plug 18 and the lower fuel element a socket 17.

FIG. 6 illustrates the equivalent electrical circuit, the capacitor C representing the effective capacitance between the electrodes 10 and 12 and the inductances 19 and 21 corresponding to one of the pairs of inductances 19 and 21 as shown in FIG. 5. Thus, it will be appreciated that all the resonant circuits are effectively coupled in cascade so that it is only necessary for the interrogating circuit to be coupled with the resultant cascaded circuit at one point and in FIG. 4 the interrogating circuit is provided by a socket 24 similar in construction to the socket 17 shown in FIG. 5 but carried on a removable member 25 located in the upper end of a fuel channel. The socket 24 carries a winding 26 which is inductively coupled with the winding 21 of the uppermost fuel element and at the same time is connected through leads 27 with the external indicating apparatus. This includes a source of variable frequency and in operation the frequency would normally be swept through a spectrum which would include all the resonant frequencies liable to be reached by the resonant circuits and as above explained when a resonant frequency is reached the impedance of the circuit will decrease and will give an increase in current.

FIG. 7 illustrates the result graphically in which each of the peaks represents a resonant frequency and hence a temperature, i.e. $t_1$, $t_2$ or $t_3$. The abscissae of the graph in FIG. 7 may be conveniently calibrated directly in terms of temperature. Clearly meter type indicating apparatus may be employed or the result may be illustrated graphically, for example, in a cathode ray tube or may be recorded on charts at fixed time intervals.

What I claim is:

1. In a nuclear reactor a plurality of adjacent fuel elements in a stack each include a tuned resonant circuit, the resonant frequency of which is controlled by the fuel element temperature, inductive couplings between resonant circuits of adjacent fuel elements so arranged that all the resonant circuits are electrically in cascade to form a composite circuit, together with an interrogating circuit inductively coupled with the composite circuit which interrogating circuit has means for determining resonance frequencies of the composite circuit and hence the temperatures to be measured.

2. In a nuclear reactor a plurality of adjacent fuel elements in a stack each include a tuned resonant circuit, the resonant frequency of which is controlled by the fuel element temperature, inductive couplings between resonant circuits of adjacent fuel elements so arranged that all the resonant circuits are electrically in cascade to form a composite circuit, together with an interrogating circuit inductively coupled with the composite circuit and means for passing A.C. through the interrogating circuit and for sweeping the frequency of the A.C. over a band which includes the range of frequencies liable to be reached by the resonant circuits.

3. In a nuclear reactor remote temperature measuring apparatus for measuring the temperatures of a fuel element comprising an inductive capacitive resonant electrical circuit mounted on the fuel element, means for controlling the capacitance and hence the resonant frequency of said circuit in accordance with the temperature of said fuel element, an external interrogating circuit, an inductance located in the core and inductively coupled with the resonant circuit on the fuel element, said inductance forming part of the interrogating circuit, and means including the interrogating circuit for ascertaining the resonant frequency of the resonant circuit and hence the temperature to be measured.

4. In a nuclear reactor remote temperature measuring apparatus for measuring the temperature of a fuel element comprising an inductive capacitive resonant electrical circuit mounted on the fuel element, means controlling the capacitance and hence the resonant frequency of said circuit in accordance with the temperature of the fuel element, an interrogating circuit, an inductance located in the core inductively coupled with the resonant circuit, said inductance forming part of the interrogating circuit, means for passing A.C. through said interrogating circuit, and means for varying the frequency of the A.C. to ascertain the resonant frequency of the resonant circuit and hence the temperature of the fuel element.

References Cited in the file of this patent
UNITED STATES PATENTS

| | | |
|---|---|---|
| 2,011,710 | Davis | Aug. 20, 1935 |
| 2,448,887 | Huckleberry | Sept. 7, 1948 |
| 2,591,644 | Wadsworth | Apr. 1, 1952 |
| 2,818,732 | Bennett | Jan. 7, 1958 |
| 2,949,415 | Stubbs et al. | Aug. 16, 1960 |